United States Patent [19]

Riley

[11] 3,845,348
[45] Oct. 29, 1974

[54] DIFFERENTIAL PRESSURE TRANSDUCER FORCE MOTOR DRIVE CIRCUIT

[75] Inventor: John E. Riley, Saugus, Mass.

[73] Assignees: General Electric Company; Bailey Meter Company, Wickliffe, Ohio

[22] Filed: Nov. 1, 1971

[21] Appl. No.: 194,394

[52] U.S. Cl................ 318/676, 318/619, 318/621, 318/687, 73/398
[51] Int. Cl. ......................................... G05b 11/01
[58] Field of Search .......... 318/676, 621, 622, 619; 73/398

[56] References Cited
UNITED STATES PATENTS

| | | | |
|---|---|---|---|
| 2,849,669 | 8/1958 | Kinkel | 318/676 |
| 2,925,544 | 2/1960 | Lang | 318/676 |
| 3,213,694 | 10/1965 | Clark et al. | 318/676 X |
| 3,376,482 | 4/1968 | Barthel | 318/676 |
| 3,457,481 | 7/1969 | Riley | 318/676 |

Primary Examiner—T. E. Lynch
Attorney, Agent, or Firm—Joseph M. Maguire

[57] ABSTRACT

A circuit for controlling a force motor in a pressure transducer. A change in pressure causes a change in the inductance of a coil in the pressure transducer. A Wien bridge oscillator circuit responsive to this inductance change generates an alternating signal proportional to the inductance. The alternating signal is peak detected, held and amplified to generate a d-c voltage proportional to the inductance. A current amplifier controlled by the d-c voltage provides a current to force motor winding that is proportional to the inductance. Normally, a variable shunt resistance is placed across the force motor winding. The circuit includes a feedback network which keeps the frequency response of the circuit independent of the value of the shunting resistance.

6 Claims, 2 Drawing Figures

PATENTED OCT 29 1974

DIFFERENTIAL PRESSURE TRANSDUCER FORCE MOTOR DRIVE CIRCUIT

BACKGROUND OF THE INVENTION

The present invention relates to differential pressure transducers and, more particularly, to an improved force motor control circuit in a force balance differential pressure transducer.

In one type of force balance differential pressure transducer, the differential pressure is converted to a force which produces a torque on a lever. The change in position of the lever causes a change in the inductance of a sensing coil. The electronic circuit of this invention senses this change of inductance and generates a current to drive a force motor which applies a balancing torque to the lever. The current supplied to the force motor will be proportional to the pressure differential. The force motor drive circuit described in U.S. Pat. No. 3,457,481, issued to John E. Riley on July 22, 1969, and assigned to the same assignee as the present invention is representative of the prior art.

One disadvantage of the force motor drive circuit of the prior art is that it required a relatively large d-c power supply of 50 volts with a current capacity of 50 milliamperes.

Another disadvantage of the force motor drive circuit of the prior art is that its accuracy is affected by wide fluctuations of the d-c power supply voltage.

It has been the practice in the art, when small pressure differentials are being measured, to shunt current around the motor so that the current supplied by the force motor drive circuit will undergo a relatively large change even though there is only a small change in the current through the motor. This makes it easier to effectively monitor small pressure differentials. When current is shunted around the motor, the gain and frequency response of the force motor drive circuit is changed. It is desirable to make the frequency response independent of the gain of the force motor drive circuit. In the prior art, this was accomplished by manually switching in a damping network which maintained the frequency response of the force motor drive circuit within the desired range.

It is an object of this invention to provide an improved force motor drive circuit for use in a differential pressure transducer.

It is another object of this invention to reduce the voltage requirements for a force motor drive circuit.

It is yet another object of this invention to provide a force motor drive circuit capable of operating reliably despite large fluctuations in the d-c power supply voltage.

And yet another object of this invention is to provide a force motor drive circuit which automatically maintains its frequency response independent of the current shunted around the force motor.

SUMMARY OF THE INVENTION

In accordance with this invention, a Wien bridge oscillator generates an output signal whose amplitude is proportional to the inductance of a detection coil in the pressure transducer. The oscillator output signal is peak detected, held and amplified to generate a d-c voltage proportional to the inductance of the detection coil. A current drive circuit converts the d-c voltage into a d-c current which drives a force motor in the pressure transducer. The voltage across the motor is included in a feedback network which maintains the frequency response of the force motor drive circuit independent of the amount of current shunted around the motor winding.

DESCRIPTION OF THE DRAWINGS

While the specifications concludes with claims particularly pointing out and distinctly claiming that which is regarded as the present invention, the objects and advantages of this invention can be more readily ascertained from the following description of a preferred embodiment when read in conjunction with the accompanying drawings in which:

DETAILED DESCRIPTION

Figure 1:
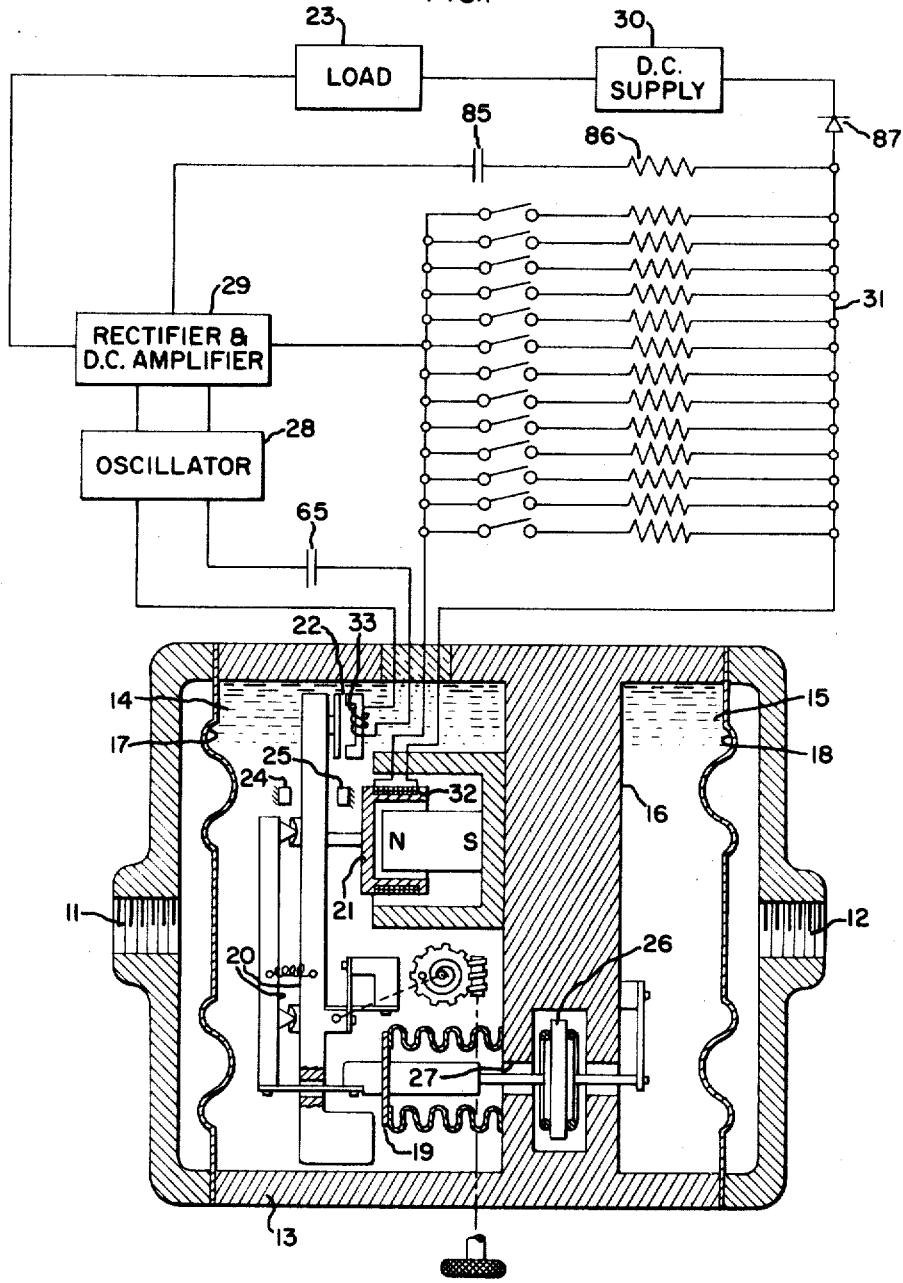
FIG. 1 schematically illustrates a differential pressure transducer to which this invention is particularly adapted.

FIG. 1 illustrates a pressure transducer system to which this invention is particularly adaptable and schematically shows a pressure measuring device as claimed in the application of Harold E. Trekell, Ser. No. 451,547, "Pressure Measuring Device," filed Apr. 28, 1965, now U.S. Pat. No. 3,342,072, issued Sept. 19, 1967, and assigned to the same assignee as the present invention. In use, pressure connections 11 and 12 in the hollow casing 13 are connected to pressure lines for measuring a difference in fluid pressure in such lines. They may, for example, be pressure lines leading from the upstream and downstream of an orifice or venturi disposed in a conduit carrying process fluid, the flow of which is to be measured or controlled.

Any difference in the pressure at the pressure connections 11 and 12 is transmitted to liquid chambers 14 and 15 defined by the hollow casing 13, a rigid partition 16 and flexible isolating diaphragms 17 and 18. This difference appears across a flexible pressure sensitive element 19 which experiences a force proportional to the pressure difference. This force is applied to a lever system 20 tending to cause rotation thereof. A counterbalancing force is applied to the lever system 20 by a force motor 21 and the magnitude of the force applied is controlled by a position detector 22 to maintain the lever system in a state of balance. As the current applied to the winding 32 of force motor 21 is proportional to the differential pressure force exerted by the pressure sensitive element 19, it indicates the differential pressure being measured; and this current is used to actuate a load device 23 which may be a meter, recorder, or differential pressure control device. Protection of the device from overpressure is provided by means of stops 24 and 25, the structure of the lever system 20 and a valve 26 which closes conduit 27.

The electrical circuit which interconnects the position detector 22 and the force motor 21 consists of an oscillator circuit 28 which is responsive to the position detector 22, and a rectifier and d-c amplifier circuit 29 which converts the signal from the oscillator circuit 28 to a control signal. Thi control signal determines the total current supplied from a d-c power supply 30 because the rectifier and d-c amplifier circuit 29, a pressure span selecting means 31 and the force motor winding 32 in parallel therewith and the load 23 are in series. If there is a change in the differential pressure across the pressure transducer, the lever system 20 tends to pivot which causes a change in the inductance of the position indicator coil 33 and thereby controls the output of the oscillator circuit 28. Variations in the output of the oscillator circuit 28 are reflected as variations in the total direct current flowing through the rectifier and d-c amplifier circuit 29 to the winding 32 of force motor 21 and the pressure span selecting means 31, the change in current being such as to counteract the change produced by the variation in differential pressure.

Figure 2:
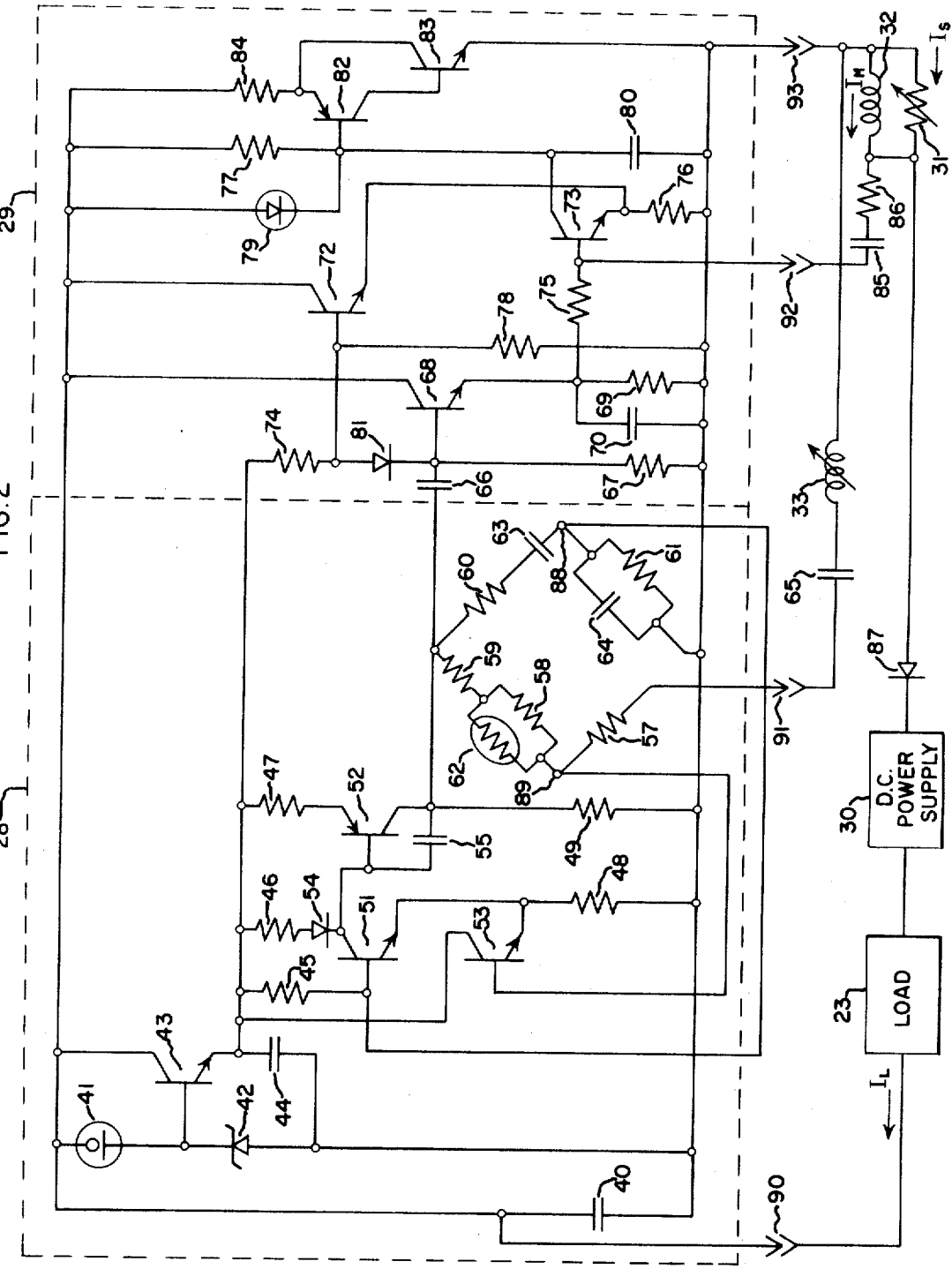
FIG. 2 is a schematic diagram of the force motor drive circuit of this invention.

An electrical circuit for interconnecting the position detector coil 33 and the force motor winding 32 is shown more specifically in FIG. 2. For the sake of convenience, certain elements shown in FIG. 2 have retained the reference designations as assigned in FIG. 1. The d-c power supply 30, the load 23 and the rectifier and d-c amplifier circuit 29 are in series with a parallel circuit constituted by the force motor winding 32 and the pressure span selecting means 31, shown in FIG. 1 as a plurality of switchable resistors but shown for simplicity as a variable resistor. The current to the force motor winding 32 and the pressure span selecting means 31 is controlled by current amplifying transistors 82 and 83, the conduction level of the current amplifying transistors 82 and 83 being determined by the inductive value of the variable inductance coil 33 associated with the position detector 22.

Regulated power for the oscillator circuit 28 and the rectifier and d-c amplifier circuit 29 is provided by a regulator circuit comprising capacitor 40, constant current device 41, zener diode 42, transistor 43 and capacitor 44. An unregulated d-c voltage is applied to the regulator circuit through input connection 90. Capacitor 40 filters the unregulated d-c voltage input. The regulator output voltage, at the emitter of transistor 43, is determined by the voltage across the zener diode 42 less the base-to-emitter voltage drop of transistor 43. Additional voltage stabilization of the zener diode 42 reference voltage is provided by constant current device 41, which minimizes the current change through the zener diode 42 even though transients may occur in the unregulated d-c voltage. Capacitor 44 filters the regulated d-c voltage output.

The oscillator circuit 28 can be broken down into a d-c differential amplifier, Wien bridge feedback network and a voltage divider network. The Wien bridge network is connected across the output of the d-c differential amplifier and a signal at the junction of the arms of the Wien bridge network is fed back to the positive input of the d-c differential amplifier, thereby forming an oscillator circuit. By means of the voltage divider network, which includes the variable inductance coil 33 and which is connected across the d-c differential amplifier output, part of the oscillator output signal is fed back to the negative input of the d-c differential amplifier, thereby making the amplitude of the oscillator output inversely proportional to the inductance of the variable inductance coil 33.

The d-c differential amplifier comprises resistors 45 through 49, transistors 51, 52 and 53, diode 54 and capacitor 55. The positive input to the d-c differential amplifier is at the base of transistor 51 and the negative input is at the base of transistor 53. The output of the d-c differential amplifier is at the collector of transistor 52. Diode 54 provides compensation for the effect of temperature on transistor 52 and capacitor 55 provides gain stability for transistor 52.

Connected across the output of the d-c differential amplifier is a Wien bridge network having a series arm comprising resistor 60 and capacitor 63 and a parallel arm comprising resistor 61 and capacitor 64. When the signal appearing at the junction 88 of the two arms of the Wien bridge network is fed back to the positive input of the d-c differential amplifier, the d-c differential amplifier will oscillate at a frequency as determined by the values of resistors 45, 60 and 61 and capacitors 63 and 64.

Also connected across the d-c differential amplifier output is a voltage divider network having a resistive arm comprising resistors 58 and 59 and thermistor 62 and a reactive arm comprising resistor 57 which is in series connection with capacitor 65 and variable inductance coil 33 through input connection 91. The signal developed at the junction 89 of the two arms of the voltage divider network is fed back to the negative input of the d-c differential amplifier. As the inductance of the variable inductance coil 33 increases, the amount of degenerative feedback increases which reduces the amplitude of oscillation of the d-c differential amplifier.

The Wien bridge oscillator has two desirable characteristics which make it particularly suitable over the prior art unijunction transistor oscillator: (1) it will operate reliably with a lower voltage across the oscillator circuit, and (2) the amplitude of the oscillator output signal can be a larger percentage of the total voltage across the oscillator circuit. These two characteristics enable the use of a lower voltage power supply with the pressure transducer.

Capacitor 65 is a d-c blocking capacitor while thermistor 62 provides additional compensation for the effect of temperature on the transistors in the oscillator circuit 28 and the rectifier and d-c amplifier circuit 29.

The rectifier and d-c amplifier circuit 29 can be broken down into a rectifier circuit which converts the a-c signal into a d-c voltage, a second d-c differential amplifier which generates a d-c voltage inversely proportional to the amplitude of the a-c signal, and a current amplifier which provides a current proportional to the d-c voltage output of the second d-c differential amplifier.

The rectifier circuit comprises resistors 67, 69, 74 and 78, diode 81, transistor 68 and capacitors 66 and 70. The input of the rectifier circuit is at the base of transistor 68. A d-c bias is applied to the base of transistor 68 by means of the network comprising resistor 74, diode 81 and resistor 67. The oscillator output signal is applied to the base of transistor 68 by means of a-c coupling capacitor 66. The peak a-c voltage is detected by the base-emitter junction of transistor 68 and stored on capacitor 70.

The second differential amplifier comprises resistors 74, 75, 76, 77 and 78, transistors 72 and 73, and capacitor 80. The positive input of the second d-c differential amplifier is at the base of transistor 72 and the negative input of the second d-c differential amplifier is at the junction of resistor 75 and the emitter of transistor 68. The output of the second d-c differential amplifier is at the collector of transistor 73. A fixed d-c voltage, as determined by the voltage divider network comprised of resistors 74 and 78, is applied to the positive input of the second d-c differential amplifier, and the peak detected a-c voltage stored on capacitor 70 is applied to the negative input, therefore, the voltage at the output of the second d-c differential amplifier will be proportional to the peak detected voltage appearing on capacitor 70. Capacitor 80 filters any signal at the oscillator frequency which may appear at the collector of transistor 73.

The current amplifier comprises resistor 84 and transistors 82 and 83. The voltage across resistor 84 is determined by the voltage across resistor 77 and the emitter-to-base voltage drop across transistor 82. Essentially all of the resulting current through resistor 84 flows through the collector and emitter of transistor 83 through input connection 93 and into the parallel circuit formed by the force motor winding 32 and the pressure span selecting means 31.

A stabistor 79 is placed in parallel with resistor 77. The stabistor 79 has a high impedance when relatively small voltages are across it, and a very low impedance once a critical voltage is reached. As applied in this circuit, the stabistor limits the voltage that can be developed across resistor 77 which in turn limits the current out of the emitter of transistor 83, thereby preventing excessive current from flowing through the load 23.

Although the pressure transducer as shown in FIG. 1 is designed to measure a large pressure differential, many specific applications only require the measurement of small pressure differentials. Without the pressure span selecting means 31 in parallel with the motor 32, as shown in FIG. 2, the current $I_L$ through the load is equal to the current $I_M$ through the motor 32. If only a small pressure differential is being measured, $I_M$, and therefore $I_L$, will undergo a slight change, and it may be difficult to accurately measure or indicate the pressure change. With the pressure span selecting means 31 in parallel with the motor 32, the current $I_L$ through the load is equal to the current $I_M$ through the motor and the current $I_S$ shunted around the motor. By appropriately adjusting the pressure span selecting means 31, the current $I_L$ through load 23 can be made to undergo a large variation even though, because of a small pressure differential, the current $I_M$ through the motor has undergone only a slight variation.

Capacitor 85 and resistor 86 from a feedback network which maintains the frequency response of the force motor drive circuit independent of changes of the span resistance 31. Without the feedback network consisting of capacitor 85 and resistor 86, a given change in the inductance of the position indicator coil 33 will cause the transistor 83 to supply a current approximately equal to $I_M + I_S$. Decreasing the span resistance across the motor 32 increases the current $I_S$, which increases the closed loop gain as well as the frequency response of the force motor drive circuit. With capacitor 85 and resistor 86 in the circuit, part of the voltage change developed across the motor 32 is fed back degeneratively to the second d-c differential amplifier through input connection 92 thereby keeping the frequency response of the force motor circuit essentially independent of span.

Component values which operate with one embodiment of the motor drive circuit herein described are as follows:

| 40 | capacitor | 0.1 micro farads |
|---|---|---|

| | | -Continued |
|---|---|---|
| 41 | diode | 1N5290 |
| 42 | zener diode | 1N750A-2 |
| 43 | transistor* | D33D30 |
| 44 | capacitor | 0.47 micro farads |
| 45 | resistor | 10 K ohms |
| 46 | resistor | 10 K ohms |
| 47 | resistor | 100 ohms |
| 48 | resistor | 4.99 K ohms |
| 49 | resistor | 2.15 K ohms |
| 51 | transistor | 2N3391 |
| 52 | transistor | 2N5356 |
| 53 | transistor | 2N3391 |
| 54 | diode | 1N4154 |
| 55 | capacitor | 330 pico farads |
| 57 | resistor | 2.37 to 2.67 K ohms as determined in test |
| 58 | resistor | 1 K ohms |
| 59 | resistor | 10 K ohms |
| 60 | resistor | 10 K ohms |
| 61 | resistor | 10 K ohms |
| 62 | thermistor | 300 ohms at 25°C |
| 63 | capacitor | 510 pico farads |
| 64 | capacitor | 510 pico farads |
| 65 | capacitor | 0.01 micro farads |
| 66 | capacitor | 0.01 micro farads |
| 67 | resistor | 499 K ohms |
| 68 | transistor* | D33D30 |
| 69 | resistor | 10 K ohms |
| 70 | capacitor | 0.47 micro farads |
| 72 | transistor* | GET-2484 |
| 73 | transistor* | GET-2484 |
| 74 | resistor | 10 K ohms |
| 75 | resistor | 100 K ohms |
| 76 | resistor | 4.99 K ohms |
| 77 | resistor | 21.5 K ohms |
| 78 | resistor | 10 K ohms |
| 79 | stabistor* | STB568 |
| 80 | capacitor | 0.01 micro farads |
| 81 | diode | 1N4154 |
| 82 | transistor | 2N6015 |
| 83 | transistor* | D42C8 |
| 84 | resistor | 21.5 ohms |
| 85 | capacitor | 0.47 micro farads |
| 86 | resistor | 215 K ohms |
| 87 | diode | 1N645 |
| * | General Electric designation | |

While the present invention has been described with reference to a specific embodiment thereof, it will be obvious to those skilled in the art that various changes and modifications may be made without departing from the invention in its broader aspects.

It is contemplated in the appended claims to cover all variations and modifications of the invention which come within the true spirit and scope of the invention.

What is claimed as new and desired to be secured by Letters Patent of the United States is:

1. In a force balance transducer system including a position detector means, a coil having a variable inductance determined by the position detector means, and a motor means for balancing the transducer, said motor means having a motor winding circuit including a variable resistance connected in electrical parallel with said motor winding, an improved motor drive circuit comprising current amplifier circuit means responsive to the inductance of said coil for supplying a d-c current proportional to said inductance to said motor winding circuit, said circuit means including a negative feedback network connected in electrical series with the motor winding itself for feeding back part of the motor winding voltage to said amplifier circuit so that the frequency response of said motor drive circuit is maintained substantially independent of the value of resistance that is connected across said motor winding.

2. In a force balance transducer system including a position detector means, a coil having a variable inductance determined by the position detector means, a motor means for balancing the transducer, said motor means having a motor winding circuit including a variable resistance connected in electrical parallel with said motor winding, and an improved motor drive circuit, the amplifier circuit means as in claim 1 further comprising:
  a capacitance element and resistance means coupled in electrical series with said motor winding circuit for feeding back part of the motor winding voltage to the amplifier means so that the frequency response of the motor drive circuit is preserved substantially independent of the value of resistance that is connected across said motor winding.

3. In a force balance transducer system including a position detector means, a coil having a variable inductance determined by the position detector means, a motor means for balancing the transducer, said motor means having a motor winding circuit including a variable resistance connected in electrical parallel with said motor winding, an improved motor drive circuit comprising:
  a. a Wien bridge oscillator circuit including circuit means responsive to the inductance of said coil, said Wien bridge oscillator circuit generating an output signal proportional to said inductance;
  b. amplifier circuit means responsive to said oscillator output signal for supplying a d-c current proportional to said inductance to said motor winding circuit; and
  c. a negative feedback network connected in electrical series with the motor winding circuit for feeding back to said amplifier circuit means part of the motor winding voltage to said amplifier so that the frequency response of said motor drive circuit is maintained substantially independent of the value of resistance that is connected across said motor winding.

4. An improved force balance transducer system as recited in claim 3 wherein said d-c current supplying means comprises a conversion circuit responsive to said oscillator output signal for generating a d-c voltage proportional to said inductance and a current drive circuit responsive to said d-c voltage for supplying a d-c current proportional to said inductance to said motor winding circuit, said conversion circuit including a feedback network for feeding back to said amplifier part of the motor winding voltage so that the frequency response of said motor drive circuit is substantially independent of the amount of resistance across said motor winding.

5. An improved force balance system as recited in claim 4 wherein said conversion circuit comprises a peak detection circuit for generating a d-c voltage substantially equal to the peak amplitude of said oscillator output signal and said amplifier comprises a d-c differential amplifier responsive to said peak detected amplitude and to a d-c reference voltage for generating a d-c voltage proportional to said inductance, said d-c differential circuit including said feedback network.

6. An improved force balance system as recited in claim 5 wherein said force motor drive circuit further comprises a voltage regulator circuit responsive to the voltage of said power supply for providing a regulated voltage to said Wien bridge oscillator.

* * * * *